United States Patent [19]

Conley et al.

[11] Patent Number: 5,369,761
[45] Date of Patent: Nov. 29, 1994

[54] AUTOMATIC AND TRANSPARENT DENORMALIZATION SUPPORT, WHEREIN DENORMALIZATION IS ACHIEVED THROUGH APPENDING OF FIELDS TO BASE RELATIONS OF A NORMALIZED DATABASE

[76] Inventors: John D. Conley, 917 Purcell Dr., Plano, Tex. 75025; Richard P. Whitehurst, 2216 Old Orchard Ct., Plano, Tex. 75023

[21] Appl. No.: 502,351

[22] Filed: Mar. 30, 1990

[51] Int. Cl.5 .......................................... G06F 15/401
[52] U.S. Cl. ................... 395/600; 364/283.1; 364/283.3; 364/226.4; 364/DIG. 1
[58] Field of Search ................. 395/600; 364/DIG. 1, 364/DIG. 2

[56] References Cited

U.S. PATENT DOCUMENTS

| | | | |
|---|---|---|---|
| 4,774,655 | 9/1988 | Kollin et al. | 364/200 |
| 4,829,427 | 5/1989 | Green | 364/300 |
| 4,894,771 | 1/1990 | Kunii et al. | 364/200 |
| 5,136,707 | 8/1992 | Block et al. | 395/600 |

OTHER PUBLICATIONS

"Optimizing the Performance of a Relational Algebra Database Interface", Smith et al., Communications of the ACM, vol. 18, No. 10, Oct. 1975, pp. 568-579.
"Fundamentals of Database Systems", Elmasri et al., 1989, pp. 23-32, 101-111, 356-362, 453-481, Benjamin/-Cummings Publishing Co., Redwood City, Calif.
Schkolnick, M., Sorenson, S. M., *The Effects of Denormalisation on Database Performance*, Australian Computer Journal, Feb., 1982, vol. 14, No. 1, pp. 12-18.
Deshpande, V., Larson, P. A., *Transforming From Flat Algebra to Nested Algebra*, 5 Jan., 1990, IEEE Proc. of 23rd Annual Hawaii Int'l Conf. on System Sciences, Kailua-Kona, Hi., USA, pp. 298-307.
Inmon, W. H., *Denormalization of Data*, SMC XII Proc. of 12th Structured Methods Conf., 6 Aug. 1987, Chicago, Ill., USA, pp. 148-165.

*Primary Examiner*—Thomas C. Lee
*Assistant Examiner*—M. N. Von Buhr
*Attorney, Agent, or Firm*—Tammy L. Williams; Richard L. Donaldson

[57] ABSTRACT

A system may be used to enable a database administrator to selectively denormalize a database transparently to users and programmers. The system keeps a record of the mapping between the denormalized fields and the base fields from which they are derived. Processors access those recorded links to keep the database self-consistent and to retrieve data from denormalized fields whenever possible.

6 Claims, 8 Drawing Sheets

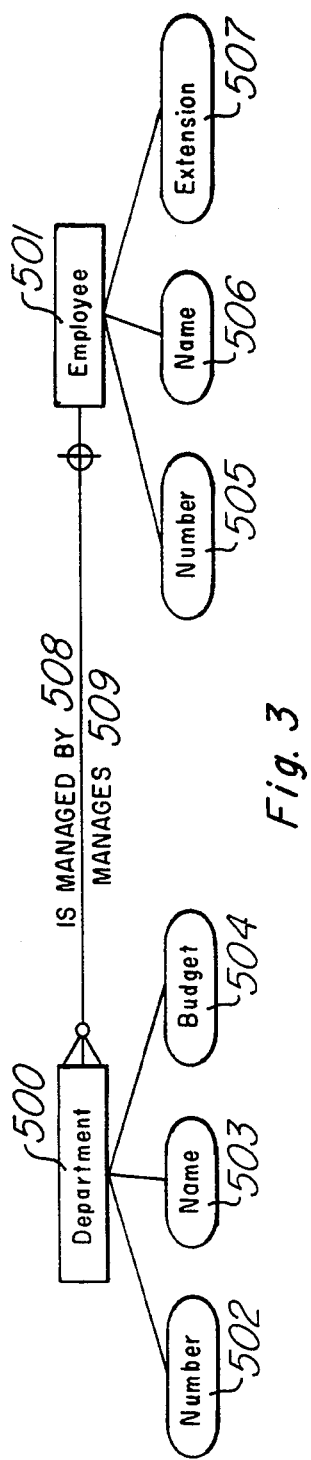

AUTOMATIC AND TRANSPARENT DENORMALIZATION SUPPORT, WHEREIN DENORMALIZATION IS ACHIEVED THROUGH APPENDING OF FIELDS TO BASE RELATIONS OF A NORMALIZED DATABASE

BACKGROUND OF THE INVENTION

1. Field of the Invention

This invention pertains to database access optimization, and more particularly to automatic and transparent denormalization support.

2. Description of the Related Art

Avoiding data anomalies is one of the most important database design considerations. One method of avoiding some data problems in relational databases is normalization. One drawback to normalization is that certain queries become much slower, because it is necessary to merge information from several tables. It is possible to denormalize the normalized tables, but that has the problem that programmers and users must write more cumbersome code.

Database integrity maintenance is a database design consideration of primordial importance. Relational databases, unless well designed, are prone to a number of different types of inconsistancies. Consider the relation schema DEPT (Name, Number, Budget, Managing Employee, Manager Extension)

and suppose a rule that one person can manage more than one department but has only one extension. That schema is subject to several of the problems described in Ullman, J., *Principles of Database Systems*, 2d ed., p212. Redundancy is the first problem discussed there. It is illustrated in the above relation schema by the fact that if the same employee manages more than one department, that person's extension would be repeated for each such department.

The second problem is potential inconsistency, also known as update anomalies, which in the example occurs when one person manages multiple departments, if the manager's extension changes, but is only updated in the row associated with one of those departments, then more than one extension would be stored for the same person. And, more important, the copies that have not been updated would be incorrect.

The third problem is insertion anomalies. Because the relation stores the telephone extension only for persons who manage a department, it is impossible to use the table to store telephone numbers for other individuals. A way to circumvent that problem, by storing a null-string for Name and Number, is unattractive because those attributes may be keys to the relation, and it is inappropriate to have NULL as a value for a key. That can be intuitively understood, because the DEPT relation holds information concerning departments, NULL is not a department and, thus represents something which does not belong in the relation. Furthermore, if a person who has not previously managed a department becomes a department manager, then there is a risk that the existing entries for that person are not deleted. The result would be multiple phone numbers for the same person.

A fourth problem is deletion anomalies. That problem is illustrated in the example by the fact that if a department is deleted from the database, because it is merged with another department, then the extension of the person who manages that department is lost.

An argument could be made that the database only contains managers, not any other employees, and therefore, the update and delete anomalies are not relevant. However, if we suppose that persons retain their extensions when transferred, then in a reorganization, it would be necessary to update the manager extension field as well as the manager field in the DEPT relation. Also, if the database is to contain extensions for non-manager employees, then the schema would have to contain a separate relation for those persons, which would mean that a manager demotion would involve updating multiple relations.

Thus, it is important in designing a particular database to organize the data in such a fashion as to avoid these types of problems. Normalization is one method for arriving at a schema which inherently avoids data anomalies. For a detailed discussion on normalization see Date, C. J., *An Introduction to Database Systems*, 3d ed., pp. 237-265, or Ullman, J., *Principles of Database Systems*, 2d ed., pp. 211-262.

Normalization is a formalistic approach to achieving the maxim that a good database design stores exactly one fact in one place. It begins with analyzing the data to determine functional dependencies. A set of attributes are functionally dependent on another set of attributes in the same relation if for any value of the latter set there is only one value for the former set. Or, a set of attributes A in relation R is functionally dependent on a set of attributes B in R if for every value of B there is only one value for A. A functional dependency may be designated with an arrow, B→A, which is read "A is functionally dependent on B" or "B functionally determines A".

Other types of dependencies are multivalued dependencies and fully functional dependencies. Those are discussed in detail in Date.

Consider the relation schema

DEPT (Name, Number, Budget, Manager, Manager Extension)

If there is only one extension per manager and, if there is only one manager per department and departments are uniquely defined by either Name or Number, then the following are some of the functional dependencies for the relation:

Name→Manager
Number→Manager
Name→Number
Number→Name
Name→Budget
Number→Budget
Manager→Manager Extension Simplistically, normalization entails removing functional dependencies into separate relations until all tables have been normalized. Hence, a possible decomposition would be to break out the last of those functional dependencies into a separate relation schema:

DEPT (Name, Number, Budget, Manager)
EMPL (Name, Extension)

In those cases where the EMPL.Name is equal to the DEPT.Manager, the EMPL.Extension would be equal to the Manager Extension in the original DEPT schema. Furthermore, the decomposition avoids the anomalies described above. Without discussing the details of various normal forms (that discussion may be found in the previously mentioned references), we make the stipulation that the DEPT and EMPL relation schema are normalized. Because the department manager's extension has to be retrieved from two tables, through a join operation, that query is slower in the normalized database than it would have been in the unnormalized version of the DEPT relation. The price for avoiding data anomalies is slower retrieval.

One method of avoiding the extra time a join requires is to selectively denormalize the database. Whereas normalization entails removing redundancy, denormalization is adding redundancy. In the previous schema the Extension may be added to the DEPT relation, yielding the following schema:

DEPT (Name, Number, Budget, Manager, EMPL__ Extension)

EMPL (Name, Extension).

The problem with denormalization is that the programmers and users must word their queries in a manner that avoids data anomalies. The denormalized database is equally prone to inconsistency and other data problems as is an unnormalized database. Therefore, every data manipulation must maintain data integrity. Furthermore, data retrieval must be worded so that information is retrieved from the denormalized relations whenever possible, otherwise denormalization is of no benefit. An additional expense is that if a relation has been denormalized, then all programs which access the denormalized relation, or the base relation from which the denormalization has been obtained, must be rewritten. Hence, performance tuning using denormalization is a very involved procedure.

SUMMARY OF THE INVENTION

It is an object of this invention to allow a database administrator to optimize a database by selectively denormalizing otherwise normalized relations transparently to users and programers who work with the database.

It is also an object of this invention to automatically maintain database integrity in a denormalized database.

These objects are accomplished in the present invention by maintaining a record consisting of a mapping between the denormalized fields and the base fields from which they are derived. The record also stores the relationship along which the field was denormalized. The invention incorporates automated procedures for retrieving information from the least expensive source, that is from a denormalized field whenever there exists such a field corresponding to a field which a user program seeks to retrieve. Furthermore, the invention maintains database integrity and transparent denormalization by automatically translating an update statement written for a normalized schema into an update statement which updates all copies of a redundantly stored fact in the corresponding denormalized schema.

BRIEF DESCRIPTION OF THE DRAWINGS

The novel features believed characteristic of the invention are set forth in the appended claims. The invention itself, however, as well as modes of use and further advantages, is best understood by reference to the following description of illustrative embodiments when read in conjunction with the accompanying drawings:

FIG. 3 is an example Entity Relationship Diagram.

FIG. 4 is a normalized relational database schema used to implement the Entity Relationship Diagram, of FIG. 3.

FIG. 5 is a denormalized version of the database of FIG. 4.

DETAILED DESCRIPTION OF THE INVENTION

Normalization is a database design methodology which entails removing redundancy in a database schema by dividing relations into smaller relations according to certain rules. The database designer normalizes the database for the sake of improving data integrity. In a normalized database, data anomalies are inherently avoided by the schema. The gain is avoidance of data anomalies, the loss is in retrieval performance, because some queries require performing a join of two or more tables.

The user must perform a join, or more accurately, request the system to perform a join, whenever a query requires association of information which is distributed over several tables.

Denormalization is a method in which the redundancy removed by normalization is selectively reintroduced so that information can be retrieved without joins. In the present invention denormalization support is automatic and transparent to the user. The users, and the application programmers, describe the data using normalized schema. Furthermore, they enter queries and data manipulation statements with respect to the normalized schema. However, the database administrator may denormalize the schema for the sake of improving retrieval speed. Although the database is denormalized, users and programmers continue to enter queries and write programs with respect to the normalized schema. Data anomalies, normally associated with an unnormalized database, are avoided by automatically generating data manipulation statements which maintain data integrity.

In the present invention, the database designers enter the data model descriptions using Entity Relationship Diagrams (ERD), a language which implements the Entity Relationship Model (ERM), Martin, J., *Information Engineering, Book* 2: *Planning and Analysis*, p. 219 et seq., 1990. Furthermore, users and application programmers enter queries using Process Action Diagrams (PAD), which is a data manipulation language for the ERM. However, the system actually stores the data using a relational database management system, for example DB2. A translator translates the ERD into the DBM's data description language, and a code generator translates the PAD statements into the data manipulation language of the DBMs. While in the present invention, automatic denormalization is built into the code generator and thus operates on the entity relationship model and its relational data model counterpart, a person skilled in the art will realize that automatic and transparent denormalization can be accomplished with or without reliance on the ERM, with only minor modifications to the invention as described in the preferred embodiment.

Figure 1:
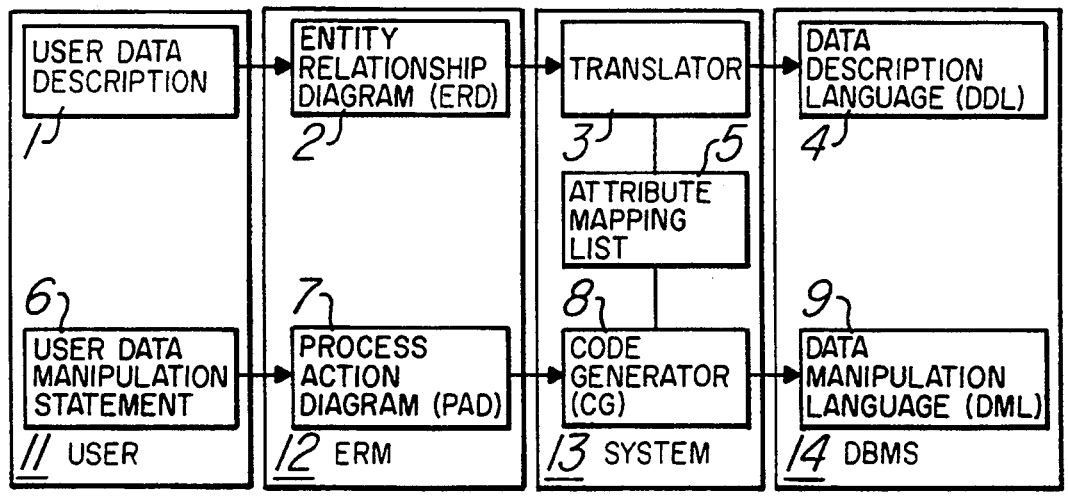
FIG. 1 is a block diagram showing how the Entity Relationship Model is used in the preferred embodiment of the invention.

FIG. 1 shows the relationship between entity relationship model 12 and relational database model 14 as used in the preferred embodiment of the invention. The user has access to the database at entity relationship model interface 12. The user enters a data description 1 using an entity relation diagram 2, which translator 3 translates into a description of the database in a relation database data description language 4. It also produces attribute mapping list 5, which is a mapping between attributes and relationships in the entity relationship model and the tables and fields in the relational model. Mapping list 5 is accessed by code generator 8 for the purpose of creating relational database data manipulation language statements 9 which corresponds to the PAD statements. When the database administrators denormalize a database, they augment mapping list 5 with a mapping between fields in the normalized relations also called the base fields, and the corresponding denormalized fields.

Figure 2:
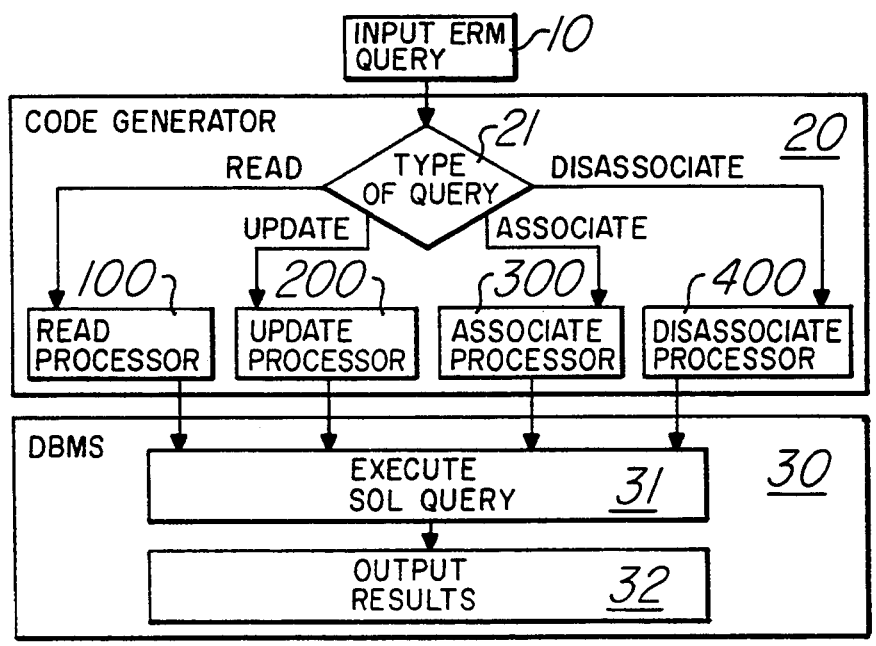
FIG. 2 is a flow chart showing how the various components of the invention are used in the preferred embodiment.

FIG. 2 shows a flow diagram for the overall processing of a query. Input processor 10 accepts a query or data manipulation statement in the PAD language. Code generator 20 translates the statement into a data manipulation language statement which database management system 30 executes. Code generator 20, in block 21 determines which kind of query is being processed. Depending on the type, the query is processed by the corresponding processing block 100, 200, 300 or 400. The output of each of those processors is a SQL statement. That statement is transmitted to database management system 30. It is executed by block 31 and the results are displayed by block 32.

It is convenient to implement denormalization in an entity relationship model, because the relationships provide a natural link over which denormalization can be accomplished. Entity Relationship Modeling is a discipline which allows data to be described both in terms of specifics about each data item and in terms of the relationships between them. The basic unit for entity relationship modeling is the entity, a thing which may be distinguished from all other things in the database. An entity type is a grouping of entities which share a definition and which have the same attributes and relationships. The following table shows some entity types and some entities:

| Entity Type | Entities |
| --- | --- |
| Department | Shoe, Accounting, Engineering |
| Employee | Jeff Levine, Jack Crouch, Jim Dinn |
| Product | 35-mm Camera, Word processor, Color TV |
| Room | Lecture room II |

Each entity will have associated with it some attributes. The attributes, but not the values of the attributes, must be the same for all entities in an entity type. For example, the attributes of the employee entity type may be name, age, number, and telephone extension. The values of the attributes is what distinguish one entity from another entity of the same entity type.

Entity Relationship Modeling also involves defining the relationships between entity types. A relationship is some relevant reason for associating two entity types. Consider the entity types above, Department and Employee. These are related because a Department Is Managed By an Employee and an Employee Manages a Department. Thus, there are two perspectives from which to view the relationship, the Employee perspective and the Department perspective. Each perspective is a relationship membership.

The particular implementation of the entity relationship model used in the preferred embodiment provides means for referring to particular occurrences of both entity types and relationship memberships. Entity View is a concept similar to the DB2 correlation name. Its values are entities of a given entity type, and has values for its various attribute views and relationship views. Whereas attribute views belong to the set of attributes which describe the entity type, relationship views belong to the set of relationship memberships of the entity type. A relationship membership view usage is a reference to the view from within a PAD statement.

For descriptive purposes, consider the entity relationship diagram shown in FIG. 3. There are two entity types, Department 500 and Employee 501. Entity type Department 500 has three attributes, Number 502, Name 503 and Budget 504, whereas Employee 501 has the attributes Number 505, Name 506 and Extension 507. There are two relationship memberships: A Department always Is Managed By 508 an Employee, and an Employee sometimes Manages 509 a Department. In the present invention the entity relationship diagram is implemented using a relational database managment system, as shown in FIG. 4. The two entity types are translated into two relations, DEPT 510 and EMPL 515, and their attributes become fields in those relations. The relationship memberships 'Is Managed BY' 508 and 'Manages°' 509 become the one field, MGR—number 514, in relation DEPT 510. That field is a foreign key, a field whose value is an identifier for another relation.

Furthermore, FIG. 4 illustrates a normalized schema. Each fact is only represented once. FIG. 5 shows the denormalized version of the same schema. The two remaining attributes from relation EMPL 515, Name 517 and Extension 518, have been added to relation DEPT 510. The names and extensions of employees who are managers will be stored both in the EMPL relation and in the DEPT relation in fields MGR—name 519 and MGR—extension 520. Those fields are considered denormalized fields. Their corresponding fields in the EMPL table, Name 517 and Extension 518, respectively, are called base fields.

The advantage gained by using a denormalized schema is that retrieval of some information becomes much faster. The following PAD statement reads the name and extension of the managing employee of the engineering department:

READ Old Department, Managing Employee
  WHERE DESIRED Old Department Is Managed
    By DESIRED Managing Employee AND DESIRED Old Department Name is EQUAL TO 'Engineering'

Where 'Old' is an entity view of entity type Department with attribute views for Number and Name, and relationship view for 'Is Managed By Employee.' Similarly, 'Managing' is an entity view of entity type Employee with attribute views for Number, Name and Extension, and relationship view for 'Manages Department.'

For the normalized schema in FIG. 4 that query is translated by code generator 20 into the following SQL statement:

```
SELECT OLD.NUMBER, OLD.NAME, MANAGING.NUMBER, MANAGING.NAME,
    MANAGING.EXTENSION
INTO :OLD-DEPARTMENT.NUMBER, :OLD-DEPARTMENT.NAME,
    :MANAGING-EMPLOYEE.NUMBER, :MANAGING-EMPLOYEE.NAME,
    :MANAGING-EMPLOYEE.EXTENSION
FROM DEPT OLD, EMPL MANAGING
WHERE (OLD.MGR_NUMBER = MANAGING.NUMBER)
AND OLD.NAME = 'ENGINEERING';
```

This SELECT statement constitutes a join because information is retrieved from more than one table. However, for the denormalized schema of FIG. 5 no join is necessary. This can be observed in the following SQL statement, generated by the code generator for the PAD query above with respect to the denormalized schema in FIG. 5:

```
SELECT OLD.NUMBER, OLD.NAME, OLD.MGR_NUMBER,
    OLD.MGR_NAME, OLD.MGR_EXTENSION
INTO :OLD-DEPARTMENT.NUMBER, :OLD-DEPARTMENT.NAME,
    :MANAGING-EMPLOYEE.NUMBER, :MANAGING-EMPLOYEE.NAME,
    :MANAGING-EMPLOYEE.EXTENSION
FROM DEPT OLD
WHERE OLD.MGR_NUMBER IS NOT NULL
    AND OLD.NAME = 'Engineering'
```

A person skilled in the art will realize that the second of the SQL statments will execute much faster.

The present invention avoids data integrity problems, in a denormalized database, by automatically generating data manipulation language statements which avoid data anomalies. The invention incorporates techniques which will insure that each type of PAD statement entered will result in SQL statements which do not introduce any data anomalies. In particular, statements which update the database must not create any ambiguous data or unintentionally delete any facts, and retrieve statements must always retrieve the "correct" result. In the preferred embodiment self-consistency in the database is achieved by cascading updates to all redundant copies of a given fact, and by always maintaining a primary source of a fact. The primary source is the normalized relation.

Figure 6:
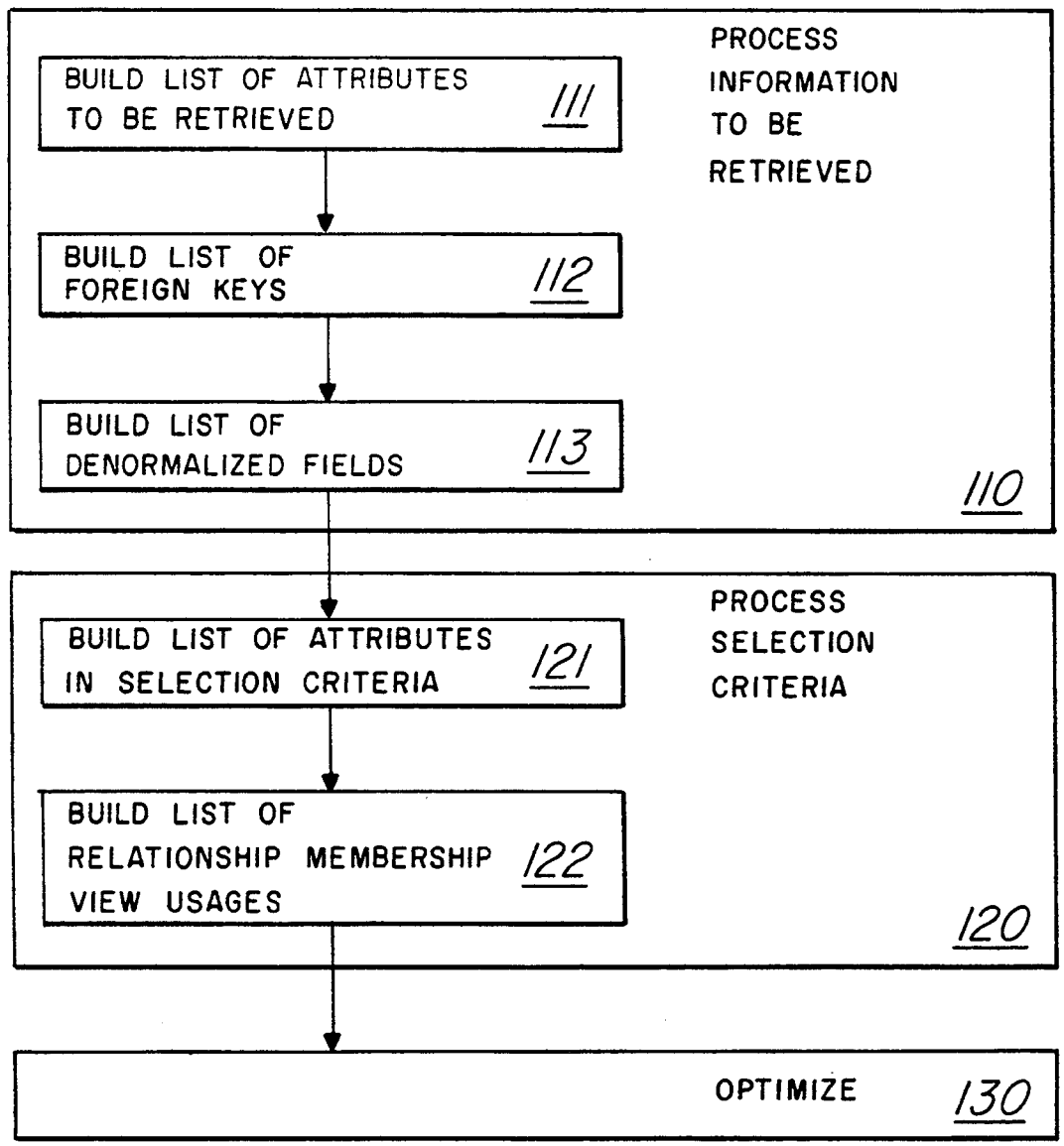
FIG. 6 is a flowchart of the READ processor.

FIG. 6 shows the components of the READ statement processor. Its goal is to produce a SELECT statement which will retrieve the correct information from the least expensive source. That is, to retrieve the information from denormalized fields whenever possible. Block 110, which comprises blocks 111 through 113, deals with the attributes which are to be retrieved. The processor starts by building a list of all attributes to be retrieved in block 111. Attributes in the PAD language are translated into relational database fields. The processor then builds a list of foreign keys, in block 112. Foreign keys are fields in the relational database used to implement relationship memberships. Third, in block 113 the processor builds a list of denormalized fields. Block 120, which comprises blocks 121 and 122, deals with the attributes used in selecting entities, or more accurately the entities found in the selection criteria. In the READ statement above the clause following the WHERE is the selection criteria. In block 121, the processor builds a list of attribute views from the WHERE clause, and in block 122, it builds a list of relationship membership view usages. The final step for the READ processor is to optimize the query, block 130.

Figure 7:
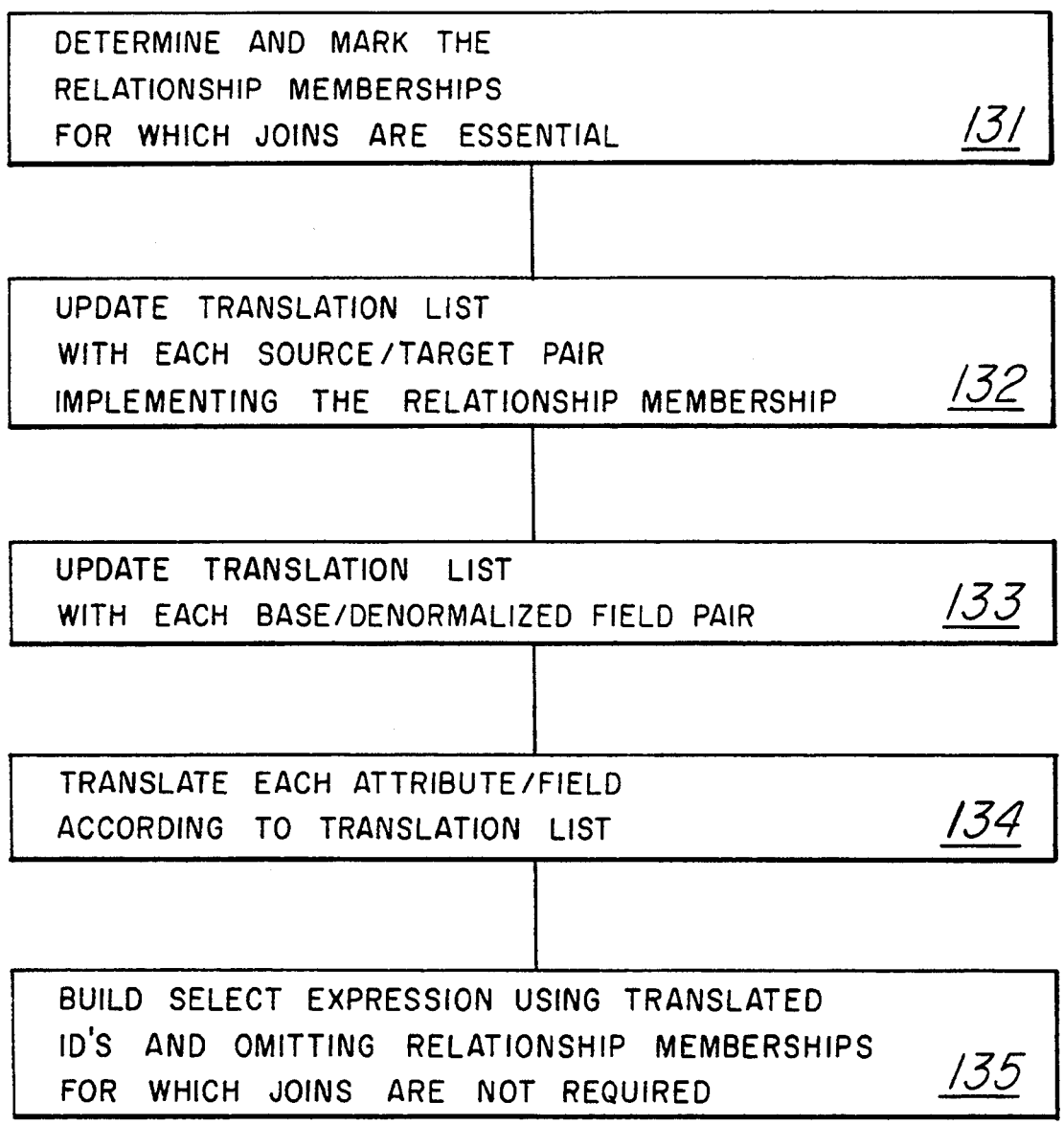
FIG. 7 is a detailed flowchart of the optimizing portion of the READ processor.

FIG. 7 further illustrates the optimization phase of the READ processor. Because one goal of the READ processor is to produce a SQL query which retrieves the desired information in the least expensive method, optimization is a crucial part of the READ processor. The first step is to determine for which relationship memberships a join is necessary, which the processor does in block 131. The criteria determining whether, to process a READ statement, a join is necessary for a particular relationship membership is whether any attributes in the target record do not exist in the source record. A target record is the record which contains the primary key and the base fields, whereas a source record is the corresponding record which contains the foreign key and the denormalized fields. By checking if the source has all the attributes requested in the query, unnecessary joins may be avoided. The second and third optimization steps, blocks 132 and 133, entail building a list of translations for relationship membership view usages for which a join is not necessary. The list contains translations for each source field/target field pair and each base/denormalized field pair. The processor, in block 134, then uses those lists to translate each attribute in the query to the appropriate field in the database. The final step, block 135, builds the SELECT query using the translated fields and omitting non-essential relationship membership view usages from the FROM clause.

Consider the READ statement from the example above, repeated here for convenience:

READ Old Department, Managing Employee
    WHERE DESIRED Old Department Is Managed
        By DESIRED Managing Employee AND DE-
        SIRED Old Department Name is EQUAL TO
        'Engineering' with the assumption that the entity view 'Old Department' contains attribute views for Number and Name, and relationship view for 'Department Is Managed By Employee', and entity view 'Managing Employee' has attribute views for Number, Name and Extension, and relationship view for 'Employee Manages Department'. The list of attributes to be retrieved, produced by block 111 is "'Old Department Number', 'Old Department Name', 'Managing Employee Number', 'Managing Employee Name', 'Managing Employee Extension'". The list of foreign keys produced by block 112 is "OLD.MGR_NUMBER", where OLD is a SQL correlation name. If the relational database schema has been denormalized as shown in FIG. 5, then the list of denormalized fields, as produced by block 113, is "OLD.MGR_name, OLD.MGR_extension". The list of attributes in the selection criteria, produced by block 121, is "'Old Department Name'" and the list of relationship membership usages from block 122 is "'Old Department Is Managed By'".

Turning to optimization block 130, because all fields in the EMPL table have been denormalized into the DEPT table, a join is not necessary for the relationship membership 'Old Department Is Managed By Managing Employee', and would be marked accordingly in block 131. The relationship membership-based translation list provides a translation from each relationship membership to a foreign key field in the relational database schema.

Block 132 builds the list for translating from each base field to a denormalized field. After it has completed processing all attributes accessed in the READ statement, the list contains the following entries: "(OLD.MGR_Number, MANAGING.Number), (OLD.Name, MANAGING.MGR_Name), (OLD.Extension, MANAGING.MGR_Extension)".

The attribute mapping list provides a translation from each attribute in the entity relationship model into a field in the relational database schema. Initially it is the following list: "('Old Department number', OLD.Number), ('Old Department Name', OLD. Name), ('Old Department Budget', OLD.Budget), ('Managing Employee Number', MANAGING. Number), ('Managing Employee Name', MANAGING.Name), ('Managing Employee Extension', MANAGING.Extension)". Thus, the list provides a mapping from the attributes in the entity relationship diagram (ERD) to fields in the data structure diagram (DSD). Update block 133 uses the translation list built by block 132 to change base fields to denormalized fields so that the list becomes " . . . ('Managaing Employee Name', OLD.MGR_Name), ('Managing Employee Extension', OLD.MGR_Extension)".

Block 134 then translates the attributes in the PAD READ statement using the list produced by block 132 and updated by block 133, and the final block of the READ processor, block 135 builds the SQL select statement without referring to the EMPL table.

In the preferred embodiment, the statements which require special handling for automatic and transparent denormalization to work without creating any data anomalies are DISASSOCIATE, ASSOCIATE, and UPDATE.

Because one of the risks of unnormalized database schema is inconsistancies, the UPDATE processor must update all copies of a redundant fact. In other words, it must update all rows in the denormalized fields in the source relation where the foreign key has the same value as the key of the target relation, and it must update the base fields in the target relation. The UPDATE processor is further illustrated in FIG. 8 and FIG. 9.

Figure 8:
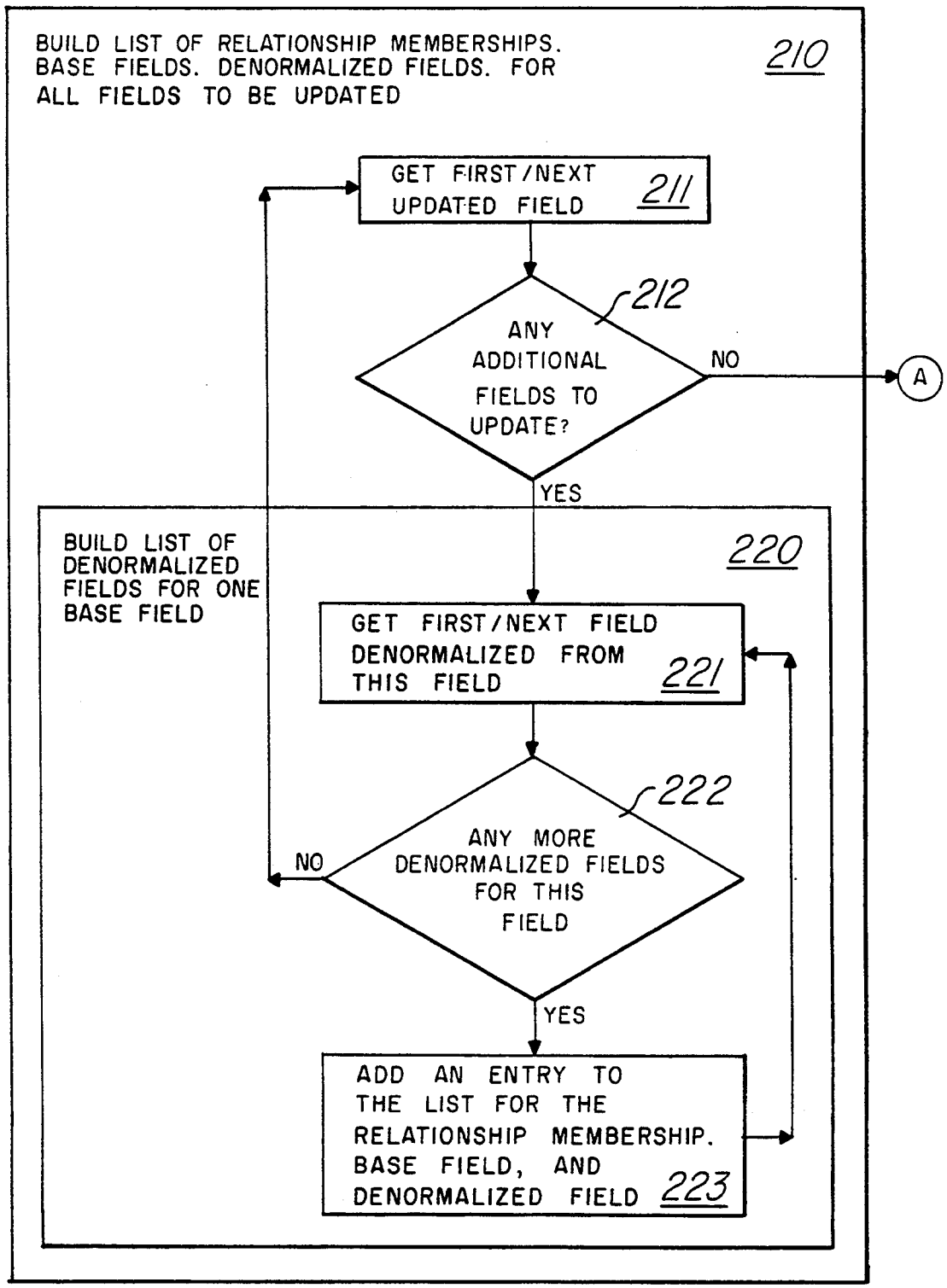
FIG. 8 is a flowchart of the front end portion of the UPDATE processor.
Figure 9:
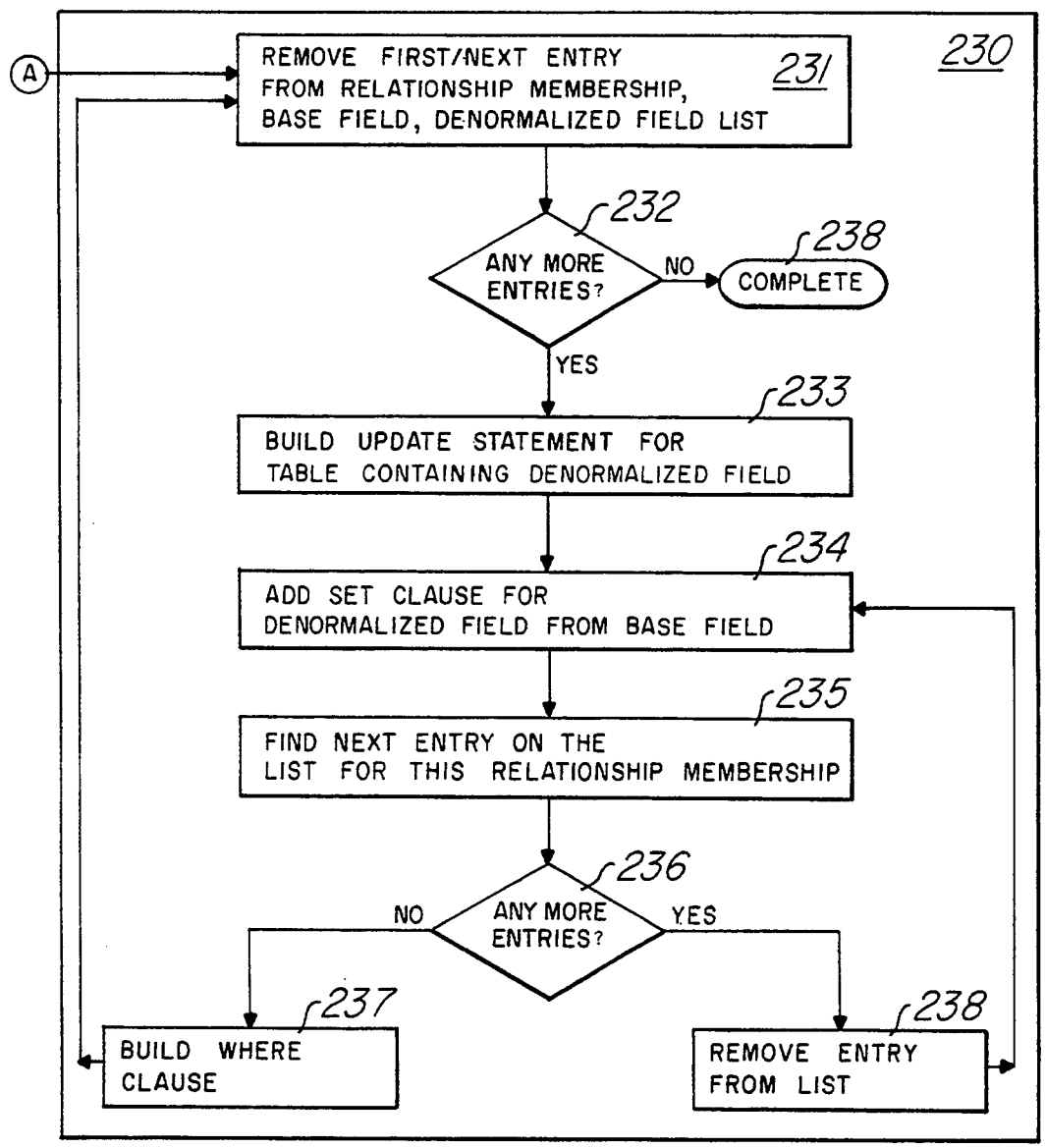
FIG. 9 is a flowchart of the final portion of the UPDATE processor.

FIG. 8 and FIG. 9 show the portions of the UPDATE processor which are required for automatic transparent denormalization. Prior to building statements to update the denormalized fields, the update processor updates the base fields. In conjunction with that task, the processor moves the new value of the base field into a PAD language host variable, which is later used to update the denormalized fields. FIG. 8 depicts the portion of UPDATE processor 200 which builds a list of denormalized fields which must be updated when a base field is updated. Block 210, which includes blocks 211 through 223, builds a list of relationship memberships, base fields and denormalized fields for all fields to be updated. Block 211 obtains the first or next field to be updated from the PAD UPDATE statement. Block 212 checks to see if a field was obtained in either block 211. If not, control is passed to block 231 in FIG. 9. Block 220, which includes blocks 221 through 223, builds a list of all denormalized fields which correspond to one particular base field. In block 221 it accesses the first or next denormalized field from the base field found in block 211. Block 222 checks if the UPDATE processor has processed all denormalized fields for the base field. If it has processed all fields, block 222 transfers control back to block 211, which accesses the next field to be updated. If block 222 does not detect that all denormalized fields have been processed, then the processor invokes block 223, which adds an entry, containing the relationship membership over which the field has been denormalized, the base field and the denormalized field, to the list. Then, block 221 locates the next denormalized field for the base field, and block 222 again checks for completion.

The portion of update processor 200 which builds a SQL statement is shown in FIG. 9. It consists of an outer loop and an inner loop. Both loops loop over the list built in block 210 of FIG. 8. Both loops remove the entry about to be processed from the list. However, whereas the outer loop builds a SQL update statement for each relationship membership, the inner loop adds a SQL set clause for each entry in the list which belongs to that relationship membership. The outer loop begins, in block 231, with the first entry on the list and when called upon again goes to the next entry on the list. A list entry is a record containing: relationship membership, base field, and denormalized field. Block 232 checks if the outer loop, in block 231, detected another entry to process. If not, the processor has completed building the SQL UPDATE statement. If block 232 does detect an entry, in block 233, the processor builds a SQL update statement for the table containing that relationship membership. The inner loop removes and processes all entries belonging to the relationship membership found by the outer loop. In block 234, the processor builds a SET clause for the denormalized field from the host variable used to update the base field. Block 235 identifies the next entry, block 236 determines if block 235 was not able to detect another entry for the relationship membership, and block 238 removes the entry from the list.

When the inner loop has finished processing all entries for a particular relationship membership, as indicated by block 236, the processor invokes block 237 to build a WHERE clause for linking the entries in the denormalized tables with the base tables.

Consider the following PAD statement, for the same entity relationship diagram as for the READ example above:

UPDATE Managing Employee
 SET Name TO Import Employee Name
where Import Employee is another view of the entity type Employee and Import Employee has an attribute view of Employee Name within that entity view. In the PAD language import views are entity views which obtain their data from an interaction screen. Similarly, Managing Department is an entity view of entity type Employee. Its value would have been set earlier in the PAD, for example using a READ. Furthermore, when the base field was updated the PAD language host variable for the NAME attribute view of the MANAGING-EMPLOYEE view was set to the value of the NAME attribute view of the IMPORT-EMPLOYEE view.

The effect of the UPDATE statement is to change the name of the manager to the name entered on the screen. In the normalized case the corresponding SQL would be:

UPDATE EMPL
SET NAME=: IMPORT-EMPLOYEE.NAME
WHERE NUMBER=: MANAGING-EMPLOYEE.NUMBER;

In the denormalized case the SQL is more complex because all redundant copies of the managing employee's name must be updated.

The processor produces two SQL update statements from the PAD UPDATE statement:

UPDATE EMPL
SET NAME=: IMPORT-EMPLOYEE.NAME
WHERE NUMBER=: MANAGING-EMPLOYEE.NUMBER;
and,
UPDATE DEPT
SET MGR_NAME=: MANAGING-EMPLOYEE.NAME;
WHERE MGR_NUMBER=: MANAGING.EMPLOYEE.NUMBER;

The UPDATE processor begins building the first of those two statements as it would for the normalized schema. It then turns to building the UPDATE statement for the denormalized relations. In block 211 it would find that the NAME field in the EMPL table is the first field to update (in this example it is the only such field). Because block 211 found a field to update, block 212 will direct control to block 220, so that a list of denormalized fields for that base field may be built. Block 221 would look to the mapping of denormalized fields to base fields and find that DEPT.MGR_NAME is a denormalized version of EMPL.NAME. Because a field was found, control block 222 would pass control to block 223 to augment the list with an entry for the field. Each entry is a triple: relationship membership for the denormalization, the base field, and the denormalized field. Thus the list built by block 223 reads "('Department is Managed by Employee', EMPL.NAME, DEPT.MGR_NAME)". Because the DEPT.MGR_NAME is the only denormalization of EMPL.NAME in this database, block 224 would not find another denormalized field, and control is passed by control block 222 to block 225. Block 225 would not find another field to update because the statement only calls for updating the Name attribute of the Managing Employee. Thus, control block 212 would direct the processor to block 231, FIG. 9. Block 231 removes the first entry, here the only entry, from the list built by block 210. Block 232, sensing that block 231 did remove an entry, passes control to block 233, which starts building the update statement for the relevant table. After block 233 the statement would read:

UPDATE DEPT

The next block, block 234, then adds SET clauses for the denormalized field:

SET MGR NAME=: MANAGING-EMPLOYEE.NAME
Block 235 would not find another entry on the list, so block 236 would pass control to block 237, which then builds the WHERE clause:

WHERE MGR NUMBER=: MANAGING-EMPLOYEE.NUMBER
There are no more entries in the list, so block 231 would find none, and block 232 would pass control out of the update processor.

Figure 10:
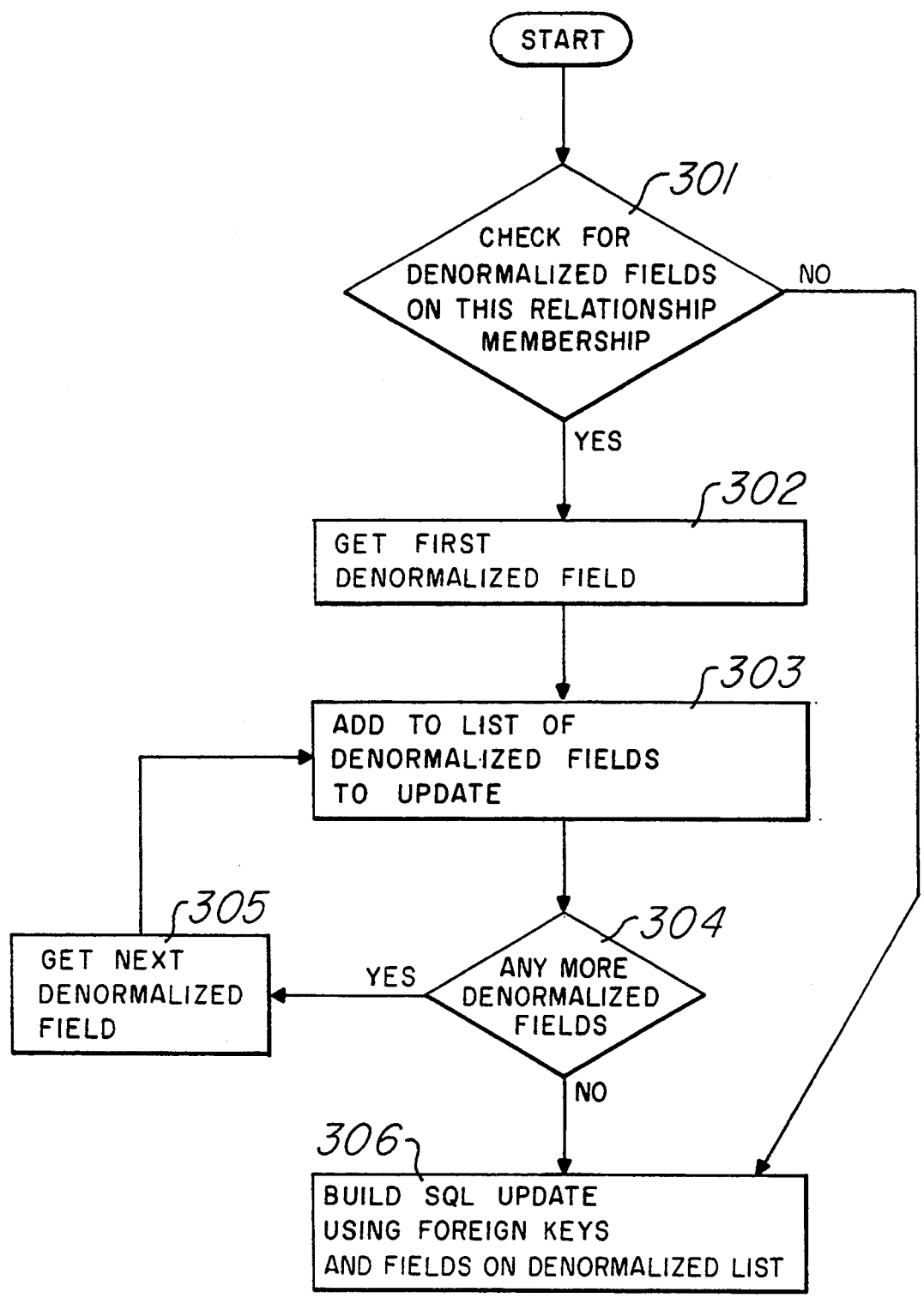
FIG. 10 is a flowchart of the ASSOCIATE processor.

ASSOCIATE processor 300 is further illustrated in FIG. 10. The ASSOCIATE command links one entity with another entity, or, in terms of the entity relationship model, establishes a relationship between two entities. Two examples of the ASSOCIATE command is:

ASSOCIATE Old Department
WITH Managaing Employee WHICH Manages IT
and,
ASSOCIATE Managing Employee
WITH Old Department WHICH Is Managed By IT ps Those two commands have exactly the same effect. The occurrence currently held in the Managing Employee view is paired along the Manages/Is Managed By relationship with the occurrence currently held in the Old Department view.

ASSOCIATE processor 300 begins, in block 301, by checking if there are any denormalized fields in the relationship membership. If not it goes directly to block 306 to build the SQL statement for implementing the relationship membership. However, if there are any denormalized fields, block 301 passes control to block 302, which gets the first denormalized field from the mapping list. Block 303 then adds that denormalized field to the list of denormalized fields. Block 304 checks to see if there are any more denormalized fields for the relationship, if there are, then block 305 retrieves that field and block 303, again, adds it to the list. When block 304 senses that there are no more denormalized fields in the relationship membership, it transfers control to block 306. Block 306 builds an SQL update statement to update the denormalized fields and the foreign keys which implement the relationship membership.

In the example above, the denormalized fields are DEPT.MGR_Name and DEPT.MGR_Extension. Block 301, thus would find that there are denormalized fields, and would transfer control to block 302. Block 302 would find DEPT.MGR_Name as the first denormalized field and block 303 would add it to the list of denormalized fields that must be updated. Because there is one more denormalized field, DEPT.MGR_Extension, block 304 would transfer control to block 305, which would find the field and block 303 would add it to the list. The list is then empty. Block 304 transfers control out of the loop and block 306 builds the SQL statement as follows:

UPDATE DEPT
SET MGR_NUMBER=: MANAGING-EMPLOYEE.NUMBER
SET MGR_NAME=: MANAGING-EMPLOYEE.NAME
SET MGR_EXTENSION=: MANAGING-EMPLOYEE.EXTENSION
WHERE NUMBER=: OLD-DEPARTMENT.NUMBER

Note that MGR_NUMBER the foreign key which implements the relationship.

Figure 11:
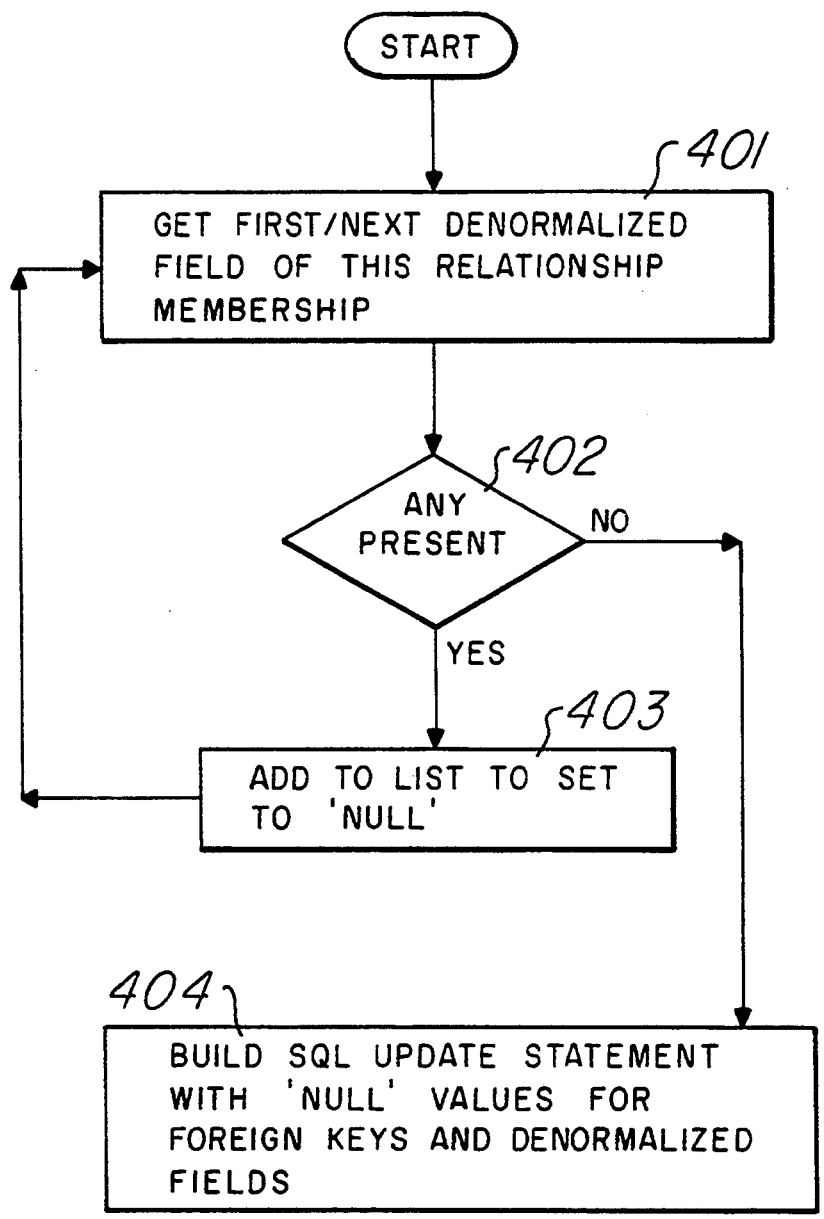
FIG. 11 is a flowchart of the DISASSOCIATE processor.

DISASSOCIATE processor 400 is illustrated in FIG. 11. The DISASSOCIATE command is the opposite of the ASSOCIATE command, in that it destroys the relationship between two entities. Two examples of the DISASSOCIATE command are:

DISASSOCIATE Managing Employee
  FROM Old Department WHICH Is Managed By IT
and,
DISASSOCIATE Old Department
  FROM Managing Employee WHICH Manages IT Like the ASSOCIATE example, these two commands have the same effect. The commands disconnect the occurrence currently held in the Managing Employee view from its pairing along the Is Managed By/Manages relationship to the Old department view.

DISASSOCIATE processor 400 begins in block 401 by getting the first denormalized field in the relationship to be disassociated. In the examples, there are two denormalized fields, DEPT.MGR_NAME and DEPT.MGR_EXTENSION. Hence, on the first loop, block 401 would get DEPT.MGR_NAME, block 402 would detect that a field was present, and block 403 would add that field to the list. On the second loop, block 403 adds DEPT.MGR_EXTENSION to the list. All fields have then been added to the list and block 402 would exit the loop and transfer control to block 404, which writes the SQL statement:

UPDATE DEPT
SET MGR_NUMBER=NULL
SET MGR_NAME=NULL
SET MGR_EXTENSION=NULL
WHERE NUMBER=: OLD-DEPARTMENT.NUMBER

Again, note that MGR_NUMBER is the foreign key which implements the relationship membership. Although the above description and the accompanying drawings describe the implementation of the automated denormalization with respect to a specific implementation which utilizes the entity relationship model and certain specific commands, that implementation and those commands are not necessary to carry out the invention. Upon studying the description, persons skilled in the art will envision modifications and alternate embodiments to the invention. It is, therefore, contemplated that the appended claims will cover such modifications that fall within the true scope of the invention.

We claim:

1. A system for improving performance of database access from a normalized database having at least two relations and thereby requiring a join of said relations by eliminating the necessity of said join of said relations and for enabling a user to access said database by formulating queries in terms of said normalized database, said normalized database having a normalized database schema, comprising:
   (a) a database convertor for converting said normalized database into an equivalent denormalized database having a denormalized database schema by appending denormalized fields to at least one of said relations; said denormalized database having said denormalized fields and corresponding base fields;
   (b) input means for accepting a query in terms of said normalized database schema;
   (c) a code generator coupled to said input means for processing said query and generating access statements in terms of said equivalent denormalized database schema thereby eliminating the necessity of said join of said at least two relations;
   (d) a database management system coupled to said code generator for executing the access statements generated by said code generator.

2. The system in claim 1, wherein said code generator further comprises:
   at least one update processor responsive to a user's request to update a given piece of data for consistently updating all instances of said given piece of data thereby maintaining database integrity;
   a read processor responsive to a user's input for transparently reading data from said denormalized database.

3. The system in claim 2, wherein said read processor produces a read statement which reads data from a denormalized field in said relations when a read statement requests data from said base field to which there is a corresponding denormalized field.

4. The system in claim 1, further comprising a mapping list for storing a mapping between denormalized fields and their corresponding base fields.

5. The system in claim 2, wherein said update processor comprises:
   an associate processor for creating links between entities stored in the database; and
   a disassociate processor for destroying links between entities in the database.

6. A method for automatically optimizing access to a normalized database of a computer having at least two relations and thereby requiring a join of said relations by eliminating the necessity of said join required for some read operations comprising the steps of:
   (a) converting said normalized database into an equivalent denormalized database having a denormalized database schema by appending denormalized fields to at least one of said relations; said denormalized database having said denormalized fields and corresponding base fields;
   (b) identifying which fields of one relation are denormalized versions of fields of other relations;
   (c) accepting input statements entered by a user in terms of a normalized database schema;
   (d) identifying if a statement entered by a user is an update statement or a read statement;
   (e) for update statements, translating the statement entered by a user in terms of a normalized database schema into a corresponding update statement in terms of said denormalized database schema which updates all redundant copies of information held in denormalized fields of relations, whenever corresponding information held in a base field has been updated; and
   (f) for read statements, translating the statement entered by a user in terms of a normalized database schema into a corresponding read statement in terms of said denormalized database schema which reads a denormalized copy of a field when the read statement requests a field for which there is a corresponding denormalized field thereby eliminating the necessity of a join of at least two relations.

* * * * *

UNITED STATES PATENT AND TRADEMARK OFFICE
CERTIFICATE OF CORRECTION

PATENT NO. : 5,369,761

DATED : Nov. 29, 1994

INVENTOR(S) : John D. Conley and Richard P. Whitehurst

It is certified that error appears in the above-indentified patent and that said Letters Patent is hereby corrected as shown below:

```
        On the title page, item [73] Assignee, should read
     --Texas Instruments Incorporated   Dallas, Texas  USA--
```

Signed and Sealed this

Fourteenth Day of October, 1997

*Attest:*

BRUCE LEHMAN

*Attesting Officer*      *Commissioner of Patents and Trademarks*